US008526365B2

(12) United States Patent
Furukawa

(10) Patent No.: US 8,526,365 B2
(45) Date of Patent: Sep. 3, 2013

(54) NETWORK SYSTEM, NODE, PACKET FORWARDING METHOD, PROGRAM, AND RECORDING MEDIUM

(75) Inventor: Hiroshi Furukawa, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 243 days.

(21) Appl. No.: 12/864,332

(22) PCT Filed: Jan. 28, 2009

(86) PCT No.: PCT/JP2009/051348
§ 371 (c)(1),
(2), (4) Date: Nov. 24, 2010

(87) PCT Pub. No.: WO2009/096423
PCT Pub. Date: Aug. 6, 2009

(65) Prior Publication Data
US 2011/0110233 A1    May 12, 2011

(30) Foreign Application Priority Data
Jan. 29, 2008   (JP) ................................. 2008-018337

(51) Int. Cl.
*G01R 31/08*   (2006.01)
(52) U.S. Cl.
USPC ....................................... 370/328; 455/422.1
(58) Field of Classification Search
USPC ....... 370/235, 328, 329, 330, 338; 455/422.1
See application file for complete search history.

(56) References Cited

U.S. PATENT DOCUMENTS

| | | | |
|---|---|---|---|
| 5,313,620 A * | 5/1994 | Cohen et al. | 713/375 |
| 2002/0141479 A1* | 10/2002 | Garcia-Luna-Aceves et al. | 375/132 |
| 2002/0196758 A1* | 12/2002 | Shoji et al. | 370/337 |
| 2009/0042555 A1* | 2/2009 | Zhu et al. | 455/422.1 |

FOREIGN PATENT DOCUMENTS

| | | |
|---|---|---|
| JP | 2002-152815 | 5/2002 |
| JP | 2003-258806 | 9/2003 |
| JP | 2006-186905 | 7/2006 |
| JP | 2007-235871 | 9/2007 |
| WO | 2007/102208 | 9/2007 |

OTHER PUBLICATIONS

Hop count independent throughput realization by a new wireless multihop relay , ISBN: 0-7803-8521-7, Sep. 26-29, 2004.*

* cited by examiner

*Primary Examiner* — Anh-Vu Ly
*Assistant Examiner* — Hashim Bhatti
(74) *Attorney, Agent, or Firm* — Rankin, Hill & Clark LLP

(57) ABSTRACT

There is proposed a network system and the like achieving a packet relay transmission with high relay transmission efficiency according to Intermittent Periodic Transmit method (IPT). In order to achieve Intermittent Periodic Transmit in a mesh cluster, a communication control unit of a core node selects one of a plurality of communication units according to downlink priority and causes the selected communication unit to transmit a packet with a periodic interval. In order to transmit a packet from the core node to another slave node, a communication control unit of a slave node selects one of the communication units according to downlink priority, and in order to transmit a packet from a slave node to the core node, the communication control unit of the slave node selects one of the communication units according to uplink priority. Then, the communication control unit causes the selected communication unit to transmit the packet.

13 Claims, 6 Drawing Sheets

(a)                    (b)

(a)

(b)

NETWORK SYSTEM, NODE, PACKET FORWARDING METHOD, PROGRAM, AND RECORDING MEDIUM

TECHNICAL FIELD

The invention of the present application relates to a network system, a node, a packet transmission method, a program, and a recording medium, and more particularly to a network system and the like including one core node and a plurality of slave nodes.

BACKGROUND ART

A wireless mesh network has received attention as a backhaul network of a low cost mobile communication infrastructure. In the wireless mesh network, base nodes are relayed and connected by a dedicated wireless link, which eliminates the necessity of installation of wireline backhaul and greatly reduces installation cost required for introduction of a mobile communication system. In the future, shrinkage of cell size is inevitable in the broadband communication, and it is necessary to install an extremely large number of base nodes. Accordingly, the installation cost of the base nodes increases to cause a serious problem. The wireless mesh network is the only technique for solving this problem.

The inventors have suggested an Intermittent Periodic Transmit method (hereinafter referred to as "IPT") that realizes a highly efficient packet relay transmission in a multihop network including a plurality of nodes (see Patent Document 1, Patent Document 2, Patent Document 3).

[Patent Document 1] Japanese Patent Laid-Open No. 2005-143046
[Patent Document 2] Japanese Patent Laid-Open No. 2006-157501
[Patent Document 3] Japanese Patent Laid-Open No. 2006-319787

DISCLOSURE OF THE INVENTION

Problems to be Solved by the Invention

In the IPT, protocols are designed on the assumption that uplink and downlink are transmitted on one-way traffic. Therefore, the characteristics deteriorate greatly when an uplink and downlink are present in a mixed manner or when the traffic is branched.

In principle, the IPT achieves the best effect in relay links arranged one-dimensionally. In reality, however, the relay nodes are arranged in a distributed manner two-dimensionally or three-dimensionally. Accordingly, the inventors have made a method capable of achieving the effect of Intermittent Periodic Transmit under any network topology by applying a path reservation as shown in Patent Document 3. However, an overhead for path reservation may occur depending on a path reservation method.

Accordingly, an object of the invention of the present application is to suggest a network system, a node, a packet forwarding method, a program, and a recording medium achieving a packet relay transmission with higher relay transmission efficiency in the IPT.

Means for Solving the Problem

An invention as claimed in claim 1 relates to a network system comprising one core node and a plurality of slave nodes, wherein each of the slave nodes includes a transmission buffer for storing a downlink packet transmitted from the core node to another slave node and an uplink packet transmitted from a slave node to the core node, a plurality of communication means for receiving a packet from another node and transmitting a packet stored in the transmission buffer to another node, and the plurality of communication means being set with two kinds of priorities, i.e., a downlink priority and an uplink priority, transmission ready packet selection means for selecting a transmission ready packet from among the packets stored in the transmission buffer, and communication control means for selecting one communication means according to the downlink priority when the transmission ready packet is the downlink packet or according to the uplink priority when the transmission ready packet is the uplink packet, and causing the selected communication means to transmit the transmission ready packet, and wherein the core node includes a transmission buffer for storing a packet, a plurality of communication means for receiving a packet from a slave node, transmitting a packet stored in the transmission buffer to a slave node, and the plurality of communication means being set with two kinds of priorities, i.e., a downlink priority and an uplink priority, transmission ready packet selection means for selecting a transmission ready packet from among the packets stored in the transmission buffer, and communication control means for selecting one communication means according to the downlink priority, and causing the selected communication means to go through a transmission waiting state to transmit the transmission ready packet, thereby defining a predetermined period as a period from when a transmission of a previous packet on the communication means is finished to when the transmission ready packet is transmitted.

The invention according to claim 2 is the network system according to claim 1, wherein each of the slave nodes includes interruption means for generating an interruption when a downlink packet is received, and the communication control means of the slave node selects one communication means when the interruption means of the slave node generates an interruption.

The invention according to claim 3 is the network system according to claim 2, wherein the core node periodically transmits a packet to a slave node.

The invention according to claim 4 is the network system according to claim 2 or 3, wherein the interruption means generates an interruption when the transmission buffer stores a predetermined number of packets or more.

The invention according to claim 5 is the network system according to claim 1, wherein each of the slave nodes has interruption means for generating an interruption when a new packet is added to the transmission buffer, and the communication control means of the slave node selects one communication means when the interruption means of the slave node generates an interruption.

The invention according to claim 6 is the network system according to any of claims 1 to 5, wherein communication means having the highest uplink priority is different from communication means having the highest downlink priority.

The invention according to claim 7 is the network system according to any of claims 1 to 6, wherein the communication control means of the core node employs a period from when a transmission of a previous packet on the communication means is finished to when the transmission ready packet is transmitted, as a transmission period set according to either a slave node to which the transmission ready packet is transmitted, a packet length of the transmission ready packet or both of them.

The invention according to claim 8 is the network system according to any of claims 1 to 7, wherein the communication control means of the core node and/or the slave node selects communication means having the highest priority in a case where not more packets than a predetermined number $P_{NT}$ are stored in the transmission buffer, and in a case where more packets than the predetermined number $P_{NT}$ are stored in the transmission buffer, the communication control means of the core node and/or the slave node selects communication means having a subsequently highest priority next to the previously selected communication means when the previously selected communication means is not communication means having the lowest priority, and selects communication means having the highest priority when the previously selected communication means is the communication means having the lowest priority.

The invention according to claim 9 is the network system according to any of claims 1 to 8, wherein the transmission ready packet selection means of the core node sets a transmission priority to a packet stored in the transmission buffer and selects a packet having the highest transmission priority as a transmission ready packet, and the transmission priority is set so that the longer a packet is stored in the transmission buffer, the higher transmission priority is set thereto, that two packets next to each other in the transmission priority are transmitted to an identical next hop node, which is a node a packet is subsequently relayed to in a case where a packet is relayed and transmitted, or that two packets next to each other in the transmission priority are transmitted to different next hop nodes.

The invention according to claim 10 is the network system according to any of claims 1 to 9, wherein the plurality of communication means transmit and receive packets with other nodes by a wireless communication, different wireless channels are respectively assigned to the plurality of communication means, and the wireless channels assigned to communication means having the same uplink priority or downlink priority on the network are the same.

The invention according to claim 11 is the network system according to any of claims 1 to 9, wherein the plurality of communication means transmit and receive packets with other nodes by a wireless communication, and wherein different wireless channels are respectively assigned to the plurality of communication means based on an interference reception level.

An invention as claimed in claim 12 relates to a node for transmitting a transmission ready packet to another node on a network, wherein the node includes a plurality of communication means being set with two kinds of priorities, i.e., a downlink priority and an uplink priority, and communication control means for selecting one communication means from among the plurality of communication means according to the downlink priority or the uplink priority, and causing the selected communication means to transmit the transmission ready packet, and in a case where the node is a slave node, the communication control means selects one communication means according to the downlink priority when a source of the transmission ready packet is a core node, and causes the selected communication means to transmit the transmission ready packet, and the communication control means selects one communication means according to the uplink priority when a destination of the transmission ready packet is the core node, and causes the selected communication means to transmit the transmission ready packet, and in a case where the node is a core node, the communication control means selects one communication means from among the plurality of communication means according to the downlink priority, and causes the selected communication means to go through a transmission waiting state to transmit the transmission ready packet, thereby defining a predetermined period as a period from when a transmission of a previous packet on the communication means is finished to when the transmission ready packet is transmitted.

An invention as claimed in claim 13 relates to a packet forwarding method in a network comprising one core node and a plurality of slave nodes, wherein the core node and each of the slave nodes include a plurality of communication means for communicating with other nodes, and communication control means for selecting one of the plurality of communication means according to any of an uplink priority and a downlink priority, i.e., two kinds of priorities set to the plurality of communication means, and causing the selected communication means to transmit a packet, in a case where a packet is relayed and transferred from the core node to the slave node, the communication control means of the core node selects any of the plurality of communication means according to the downlink priority, and causes the selected communication means to go through a transmission waiting state to transmit the packet to the slave node to which the packet is relayed and transferred, the communication control means of the slave node having received the packet selects one of the plurality of communication means according to the downlink priority when a destination of the packet is another slave node, and causes the selected communication means to transmit the packet to the slave node to which the packet is relayed and transferred, and in a case where a packet is relayed and transferred from the slave node to the core node, the communication control means of the slave node selects one of the plurality of communication means according to the uplink priority, and causes the selected communication means to transmit the packet.

An invention as claimed in claim 14 relates to a program for causing a computer to function as the communication control means according to claim 12.

An invention as claimed in claim 15 relates to a recording medium for recording the program according to claim 14.

It should be noted that the core node may include interruption means for generating an interruption when the transmission buffer is not vacant, and the communication control means of the core node may select one communication means when the interruption means generates interruption.

In the invention set forth in claim 6, the uplink priority and the downlink priority may be set in an opposite manner such that communication means having a high uplink priority has a low downlink priority and communication means having a low uplink priority has a high downlink priority.

Further, each node may be connected to a plurality of terminals. Each node may operate as an access point to relay and transmit uplink packets sent from the plurality of terminals or downlink packets addressed to the terminals.

Further, when the uplink or the downlink happens to be vacant, packet transmission in the reverse line may be allowed (transmission of aggregated packets in uplink and downlink). Therefore, the communication quality can be further improved. Further, for example, when an uplink packet is transmitted via a downlink channel, Intermittent Periodic Transmit may be carried out. When a downlink packet is transmitted via an uplink channel, downlink synchronous IPT may be carried out in the same manner as the uplink packet.

Effects of the Invention

According to the invention of the present application, IPT can be achieved without path reservation and high relay transmission efficiency can be achieved, under a multi-channel environment in which each node has communication means such as a plurality of wireless interfaces.

That is, uplink traffic to the core node (the source node connected to a wired circuit) and downlink traffic from the core node are separately handled by different wireless IFs, so that interference between uplink and downlink can be eliminated. Further, with attention to the fact that the downlink traffic is made according to a polling type access initiated by the core node, Intermittent Periodic Transmit is achieved without conventional reservation procedure in making path selection.

Further, as described in the invention set forth in claim 2, a downlink packet transmitted by path selection IPT is treated as if it is an uplink polling signal, so that the effect of Intermittent Periodic Transmit can also be obtained in the uplink (downlink synchronous IPT).

Further, as described in the invention set forth in claim 9, a packet stored in the transmission buffer for a long time may be selected with a higher priority (FIFO transmission). Alternatively, the transmission priorities may be set such that two packets next to each other in transmission priority have the same next hop node (concentrated transmission). Still alternatively, the transmission priorities may be set such that two packets next to each other in transmission priority have different next hop nodes (round-robin transmission). Relating to the above, for example, by transmitting packets in the same direction at a time by packet buffering and scheduling interference between packets having different destinations can be suppressed and higher relay transmission efficiency can be achieved.

Further, each relay node arranged in a space in a distributed manner receives a different degree of radio interference according to a location at which the node is installed. Accordingly, as described in the invention set forth in claim 11, different channels may be assigned according to the state of communication such as radio interference. In this case, when channels assigned to communication means having the same uplink priority or downlink priority are different between two nodes in communication, the communication means in one node may tune to a channel assigned for the communication means of the other node unless the communication means is used to transmit a packet. As described above, channels are dynamically selected for each relay link and each packet, so that a channel having the best quality is always adaptively selected for each relay node, and the communication quality can be improved.

For example, the invention of the present application can be widely applied to wireless communication systems in general. More specifically, the invention can be applied to wireless mesh point relay transmission, fixed microwave radio, wireless LAN, terrestrial mobile communication, digital broadcast, and the like.

Figure 1:
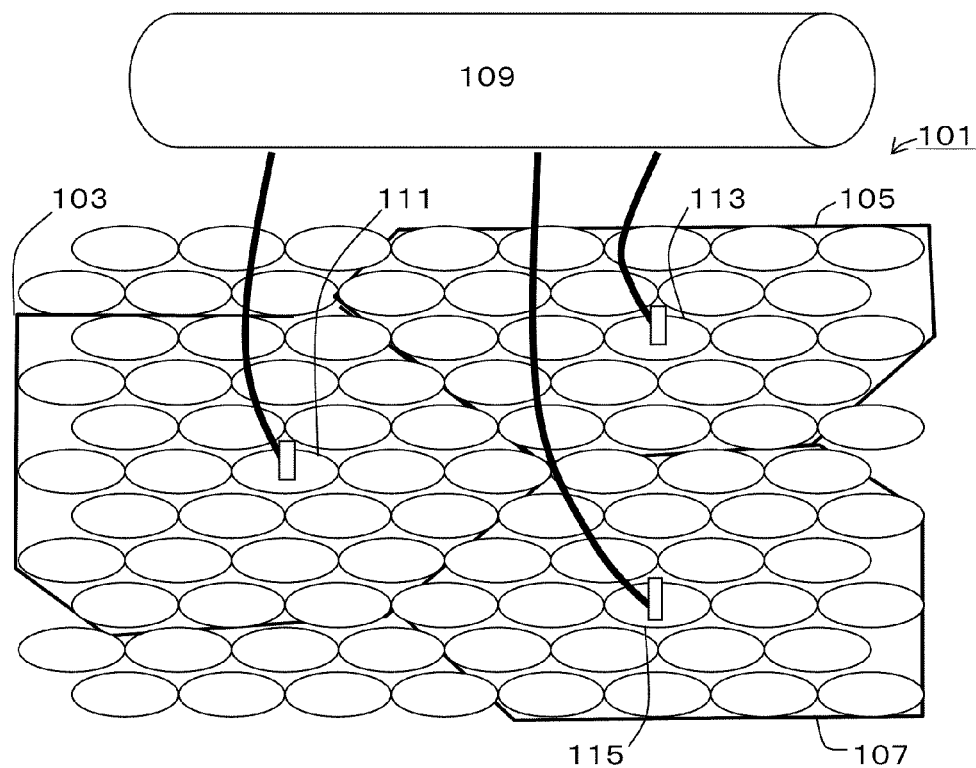
FIG. 1 is a diagram illustrating an example of a wireless mesh network.

| DESCRIPTION OF REFERENCE NUMERALS | |
|---|---|
| 21 | core node |
| 23 | transmission buffer |
| $29_1, \ldots, 29_N$ | communication unit |
| 31 | transmission trigger packet selection unit |
| 33 | interruption unit |
| 35 | communication control unit |
| 41 | slave node |
| 43 | transmission buffer |
| $49_1, \ldots, 49_N$ | communication unit |
| 51 | transmission trigger packet selection unit |
| 53 | interruption unit |
| 55 | communication control unit |

BEST MODE FOR CARRYING OUT THE INVENTION

The embodiment of the invention of the present application will be hereinafter described with reference to the drawings.

First Embodiment

FIG. 1 is a diagram illustrating an example of a wireless mesh network. In FIG. 1, a wireless mesh network 101 includes mesh clusters 103, 105, 107. Each mesh cluster includes a plurality of nodes. Each node is an element constituting a network. For example, the node operates as a computer and an access point (a plurality of terminals are connected to each node, and packets transmitted from these terminals and packets transmitted to these terminals are relayed by each node). The plurality of nodes can communicate with each other, and are connected in a so-called mesh form (see FIG. 2(a)). The mesh clusters 103, 105, 107 respectively include core nodes 111, 113, 115. The core nodes 111, 113, 115 are source nodes connected to a wireline core network 109, i.e., an external network. In the below description, nodes other than the core nodes are referred to as slave nodes in a mesh cluster.

Figure 2:
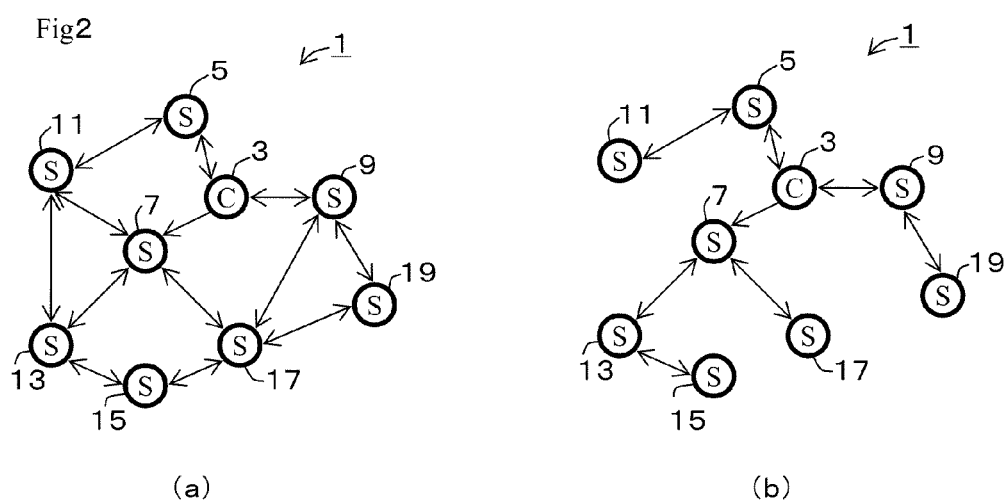
FIG. 2(a) illustrates a mesh cluster 1, i.e., an example of mesh clusters 103, 105, 107 of FIG. 1.
FIG. 2(b) illustrates an example of a relay path having a tree structure in which a root is a core node 3 included in the mesh cluster 1.

FIG. 2 is a diagram illustrating an example of the mesh cluster 1, i.e., an example of the mesh clusters 103, 105, 107 of FIG. 1, and a relay path having a tree structure in which a root is a core node 3 included in the mesh cluster 1.

As shown in FIG. 2(a), the mesh cluster 1 includes nine nodes. One of the nodes is a core node 3. Eight of the nodes are slave nodes 5, 7, 9, 11, 13, 15, 17, 19. The core node 3 can directly communicate with the slave nodes 5, 7, 9. The slave node 5 can directly communicate with the core node 3 and the slave node 11. The slave node 7 can directly communicate with the core node 3 and the slave nodes 11, 13, 17. The slave node 9 can directly communicate with the core node 3 and the slave nodes 17, 19. The slave node 11 can directly communicate with the slave nodes 5, 7, 13. The slave node 13 can directly communicate with the slave nodes 7, 11, 15. The slave node 15 can directly communicate with the slave nodes 13, 17. The slave node 17 can directly communicate with slave nodes 7, 9, 15, 19. The slave node 19 can directly communicate with the slave nodes 9, 17.

As shown in FIG. 2(b), a relay path having a tree structure is set in the mesh cluster 1. In the tree structure, the core node 3 is the root, and branches are set between nodes that can directly communicate with each other. The slave nodes 5, 7, 9 are children of the core node 3. The slave node 11 is a child of the slave node 5. The slave nodes 13, 17 are children of the slave node 7. The slave node 15 is a child of the slave node 13. The slave node 19 is a child of the slave node 9. In the below description, a direction from the core node 3 to each slave node is referred to as downlink direction, and a direction from each slave node to the core node 3 is referred to as uplink direction. Further, a packet transmitted from the core node 3 to a slave node is referred to as downlink packet, and a packet transmitted from a slave node to the core node 3 is referred to as uplink packet. When a packet is relayed and transmitted, a node subsequently relays the packet (for example, the slave node 7 in a case where the packet is relayed and transmitted from the core node 3 to the slave node 15) is referred to as a next hop node.

Figure 3:
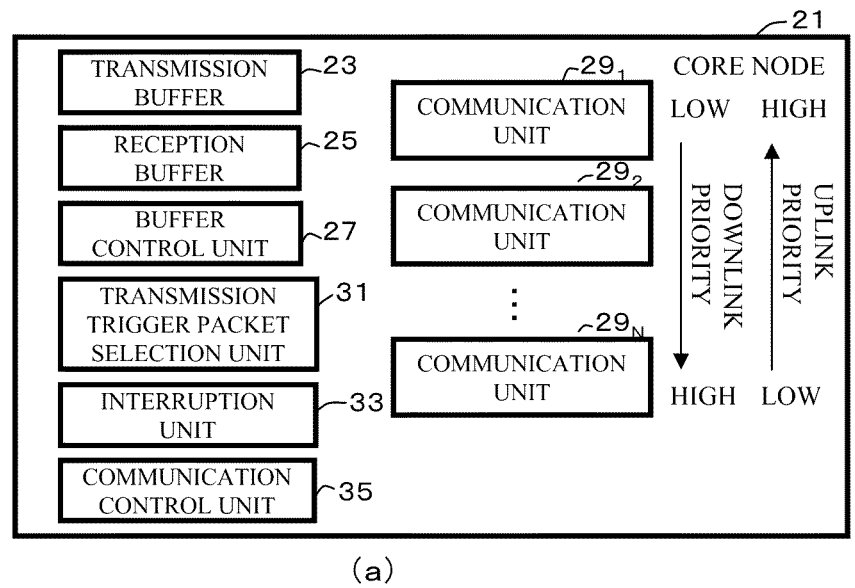
FIG. 3 is a block diagram illustrating examples of a core node 21 and a slave node 41 according to an embodiment of the invention of the present application.
Figure 3:
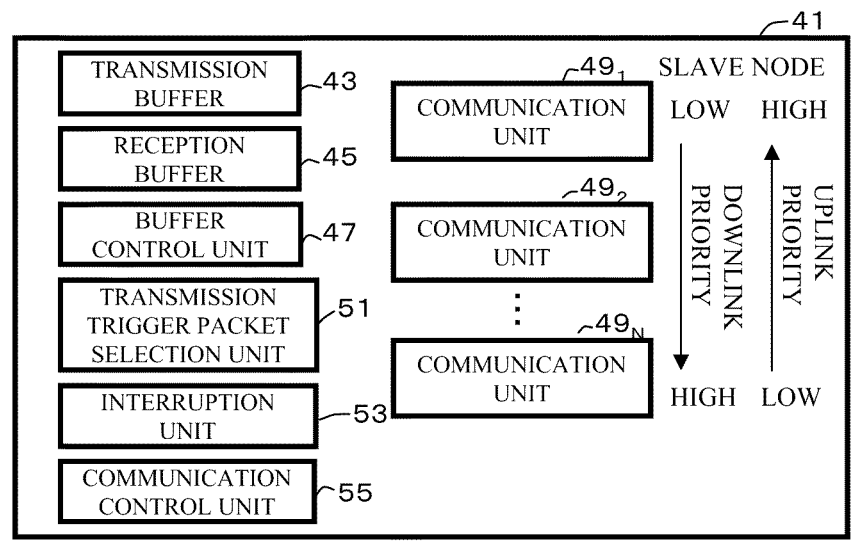
Figure 4:
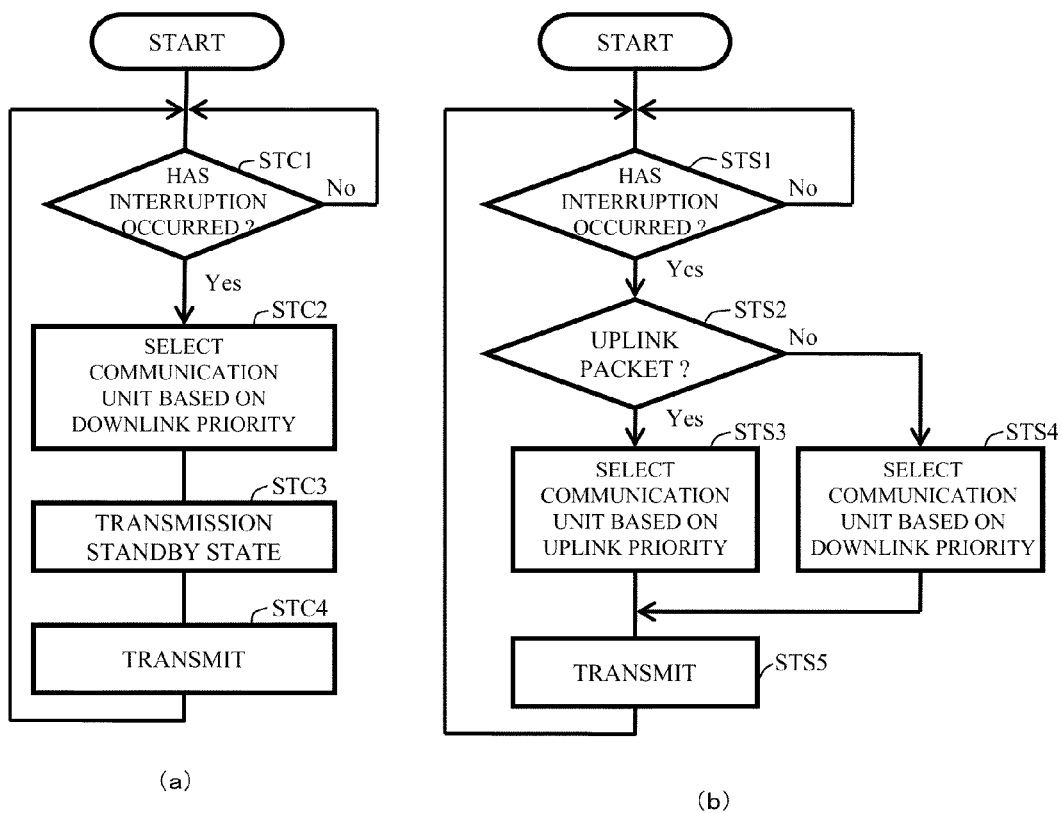
FIG. 4 is a flow diagram illustrating an example of operation of a communication control unit 35 of FIG. 3(a) and a communication control unit 55 of FIG. 3(b).

FIG. 3 is a block diagram illustrating examples of a core node 21 and a slave node 41 according to the embodiment of the invention of the present application. FIG. 4 is a flow diagram illustrating operation of a core node 21 and a slave node 41 of FIG. 3. The configuration and operation of the core node and the slave node will be described below with reference to FIG. 3 and FIG. 4.

First, the configuration of the core node will be described with reference to FIG. 3(a) and FIG. 4(a).

As shown in FIG. 3(a), the core node 21 includes a transmission buffer 23 storing packets to be transmitted, a reception buffer 25 for storing received packets, a buffer control unit 27 for controlling the transmission buffer 23 and the reception buffer 25, a plurality of communication units $29_1, \ldots 29_N$ for communicating with a slave node, a transmission trigger packet selection unit 31 selecting, as a transmission trigger packet, one of the packets stored in the transmission buffer 23, an interruption unit 33 for generating an interruption for transmission allowance when a packet transmission criterion is true, and a communication control unit 35 for selecting one of the communication units $29_1, \ldots, 29_N$ and causes the selected communication unit to transmit a transmission trigger packet.

The communication units $29_1, \ldots, 29_N$ are wireless units, each of which is assigned with a different channel and wirelessly communicates with slave nodes. Two kinds of priorities, i.e., uplink priority and downlink priority, are set to the communication units $29_1, \ldots, 29_N$. The uplink priority and the downlink priority are set to the communication units $29_1, \ldots, 29_N$ in this order in an opposite manner such that a communication unit having a high downlink priority has a low uplink priority and a communication unit having a high uplink priority has a low downlink priority. In the below description, the communication unit $29_1$ has the highest uplink priority and the lowest downlink priority. The communication unit $29_2$ has the second highest uplink priority and the second lowest downlink priority. Likewise, the communication unit $29_N$ has the lowest uplink priority and the highest downlink priority.

The buffer control unit 27 stores packets received by the communication units $29_1, \ldots, 29_N$ to the reception buffer 25. Further, the buffer control unit 27 stores, to the transmission buffer 23, packets, for example, generated by the core node 21 and addressed to a slave node, and/or packets received from an external network (see the wireline core network 109 of FIG. 1) and addressed to a slave node. It should be noted that the packets stored in the transmission buffer 23 are downlink packets, which are to be transmitted from the core node to a slave node.

The transmission trigger packet selection unit 31 sets transmission priorities to a group of packets stored in the transmission buffer 23, and selects a packet having the highest transmission priority as a transmission trigger packet, i.e., a packet to be subsequently transmitted (forwarded). For example, the transmission priorities may be set such that a high priority is set to a packet stored in the transmission buffer 23 for a long time (FIFO transmission). Alternatively, the transmission priorities may be set such that two packets next to each other in transmission priority have different next hop nodes (round-robin transmission). Still alternatively, the transmission priorities may be set such that two packets next to each other in transmission priority have the same next hop node (concentrated transmission).

The interruption unit 33 issues an interruption for transmission allowance when a packet transmission criterion is true. The packet transmission criterion may be, for example, the one that the transmission buffer 23 is not vacant, and packets are readily transmitted to slave nodes.

When the interruption unit 33 issues an interruption for transmission allowance, the communication control unit 35 selects one of the communication units according to the downlink priority, causes the selected communication unit to go through a transmission waiting state to transmit a transmission trigger packet.

The operation of the communication control unit 35 will be specifically described with reference to FIG. 4(a). FIG. 4(a) is a flow diagram illustrating operation of the communication control unit 35 of FIG. 3(a).

First, the communication control unit 35 determines whether an interruption for transmission allowance has occurred or not (step STC1).

Subsequently, the communication control unit 35 selects a communication unit based on the downlink priority when an interruption occurs (step STC2). More specifically, when the number of packets stored in the transmission buffer 23 is not more than a predetermined number $P_{NT}$, the communication unit $29_N$ having the highest downlink priority is selected. In a case where the number of packets stored in the transmission buffer 23 is more than $P_{NT}$, the selection is made as follows. When the previously selected communication unit is a communication unit other than the communication unit $29_1$ having the lowest priority, such as the communication units $29_N$, $29_{N-1}, \ldots, 29_1, 29_N, 29_{N-1}, \ldots$, a communication unit having a subsequently highest downlink priority next to the previously selected communication unit is selected. When the previously selected communication unit is the communication unit $29_1$, the communication unit $29_N$ having the highest downlink priority is selected. As described above, the communication control unit 35 selects a communication unit based on the packet selection criterion according to the state of the transmission buffer 23 and the downlink priority.

Subsequently, the communication control unit 35 causes the selected communication unit to go through the transmission waiting states so that a time from when a previous transmission of a packet on the communication unit is finished to when the transmission trigger packet is transmitted becomes equal to, for example, a transmission period set according to the slave node to which the transmission trigger packet is transmitted and a packet length of the transmission trigger packet (step STC3), and thereafter causes the selected communication unit to transmit the transmission trigger packet (step STC4). Then, the program returns back to the processing of step STC1.

Subsequently, the configuration of the slave node will be described with reference to FIG. 3(b) and FIG. 4(b).

In the same manner as the core node 21 of FIG. 3(a), the slave node 41 includes, as shown in FIG. 3(b), a transmission buffer 43 for storing packets to be transmitted, a reception buffer 45 for storing received packets, a buffer control unit 47 for controlling the transmission buffer 43 and the reception buffer 45, a plurality of communication units $49_1, \ldots 49_N$ for communicating with a slave node, a transmission trigger packet selection unit 51 for selecting, as a transmission trigger packet, one of the packets stored in the transmission buffer 43, an interruption unit 53 for generating an interruption for transmission allowance when a packet transmission criterion is true, and a communication control unit 55 for selecting one of the communication units $49_1, \ldots, 49_N$ and causes the selected communication unit to transmit a transmission trigger packet.

The communication units $49_1, \ldots, 49_N$ are wireless units, each of which is assigned with a different channel and wirelessly communicates with other nodes. In the same manner as the communication units $29_1, \ldots, 29_N$, the uplink priority and the downlink priority are set to the communication units $49_1, \ldots, 49_N$.

The buffer control unit 47 stores packets received by the communication units $49_1, \ldots, 49_N$ to the reception buffer 45. Further, the buffer control unit 47 stores, to the transmission buffer 43, packets, for example, generated by the slave node 41 and addressed to other nodes and/or packets received from another slave node and addressed to another slave node. The packets stored in the transmission buffer 43 include uplink packets and downlink packets.

The transmission trigger packet selection unit 51 sets transmission priorities to a group of packets stored in the transmission buffer 43, and selects a packet having the highest transmission priority as a transmission trigger packet. For example, the transmission priorities may be set such that a high priority is set to a packet stored in the transmission buffer 43 for a long time (FIFO transmission).

The interruption unit 53 issues an interruption for transmission allowance when a packet transmission criterion is true.

The packet transmission criterion may be, for example, the one that a new packet is added to the transmission buffer 43 (downlink asynchronous IPT). For example, this is the case when the transmission buffer 43 receives a packet from another slave node or core node, or when a packet is generated in the slave node.

Alternatively, the packet transmission criterion may be the one that a new downlink packet is added to the transmission buffer 43 (downlink synchronous IPT). In particular, the downlink synchronization can achieve a further better relay transmission efficiency. In other words, the downlink synchronization is based on the observation that a relay transmission is conducted as if a core node performs polling in the downlink. In the uplink, downlink packets relayed and transmitted by the IPT in the downlink are treated as a polling signal, and transmission is performed in synchronization therewith. This transmission enables avoiding collision of relay packets, and achieves further better relay transmission efficiency. However, in the downlink synchronization, uplink packets may be accumulated in a slave node when downlink packets are not so much received. Accordingly, for example, a vacant downlink packet may be transmitted by the IPT from a core node with a regular interval. Alternatively, when a predetermined number of packets or more are accumulated in a slave node, the interruption unit 53 may generate an interruption for transmission allowance and perform packet transmission of the transmission buffer 43 without waiting for receiving packets from other nodes.

When the interruption unit 53 generates an interruption for transmission allowance, the communication control unit 55 selects one of the communication units according to the uplink priority when the transmission trigger packet is an uplink packet or selects one of the communication units according to the downlink priority when the transmission trigger packet is a downlink packet, and causes the selected communication unit to transmit the transmission trigger packet.

The operation of the communication control unit 55 will be specifically described with reference to FIG. 4(b). FIG. 4(b) is a flow diagram illustrating operation of the communication control unit 55 of FIG. 3(b).

First, the communication control unit 55 determines whether an interruption for transmission allowance has occurred or not (step STS1).

Subsequently, the communication control unit 35 determines whether the transmission trigger packet is an uplink packet or not (step STS2). When the transmission trigger packet is determined to be an uplink packet, the communication control unit 35 selects a communication unit according to the uplink priority in the same manner as what is described about step STC2 of FIG. 4 (step STS3). When the transmission trigger packet is determined to be a downlink packet, the communication control unit 35 selects a communication unit according to the downlink priority in the same manner as what is described about step STC2 of FIG. 4 (step STS4).

Subsequently, the communication control unit 35 causes the selected communication unit to transmit a transmission trigger packet without going through the communication standby state (step STS5). Then, the program returns back to the processing of step STS1.

Now, the above description is summarized. The operations of the core node and the slave node can be summarized as shown in the following table. In other words, only the slave node is related to the transmission of the uplink packet. However, the communication unit is selected according to the uplink priority, and transmission processing is performed upon generation of an interruption for transmission allowance. On the other hand, transmission of the downlink packet is performed by not only the core node but also the slave node. The communication unit is selected according to the downlink priority. The core node transmits packets intermittently and periodically. The slave node performs transmission processing upon generation of an interruption for transmission allowance.

TABLE 1

| TRANSMISSION TRIGGER PACKET | SELECT COMMUNICATION UNIT | CORE NODE | SLAVE NODE |
|---|---|---|---|
| UPLINK PACKET | UPLINK PRIORITY | — | IMMEDIATELY |
| DOWNLINK PACKET | DOWNLINK PRIORITY | INTERMITTENT PERIODIC | IMMEDIATELY |

Regarding the channels assigned to the communication units $29_1, \ldots, 29_N$, the same wireless channel may be assigned to the communication units having the same uplink priority or downlink priority in all the nodes (fixed channel assignment).

Further, in a case of the slave node, each communication unit assigns a wireless channel in which the smallest radio interference is received in a relay destination node to which the slave node relays. When the relay source node and the relay destination node have different wireless channels assigned to wireless units having the same uplink priority or downlink priority, the relay destination node may choose the wireless channel of the relay source node unless the node performs transmission (dynamic channel selection). In particular, the dynamic channel selection enables further reducing interference. In other words, when application to an ISM band is considered, there are two interference sources, i.e., an interference generated from a neighboring relay circuit occurring within the mesh cluster of its own and an interference generated from another wireless system. A channel that is least affected by an interference is dynamically selected for each relay link, and robust relay transmission can be achieved even under the ISM band. The dynamic channel selection in view of the IPT is performed, so that multiplier effect with multi-channel IPT can be achieved.

Further, flowing traffic is sparse in nodes located on an outer part of the mesh cluster. For example, when transmission is made only in a downlink, traffic reserved for uplink is seldom used. Accordingly, between slave nodes, packets in the opposite direction may flow through non-used traffic (link borrowing).

Second Embodiment

Subsequently, a simulation result relating to the invention of the present application will be shown with reference to FIG. 5 to FIG. 9, and the effectiveness of the invention of the present application will be described.

Figure 5:
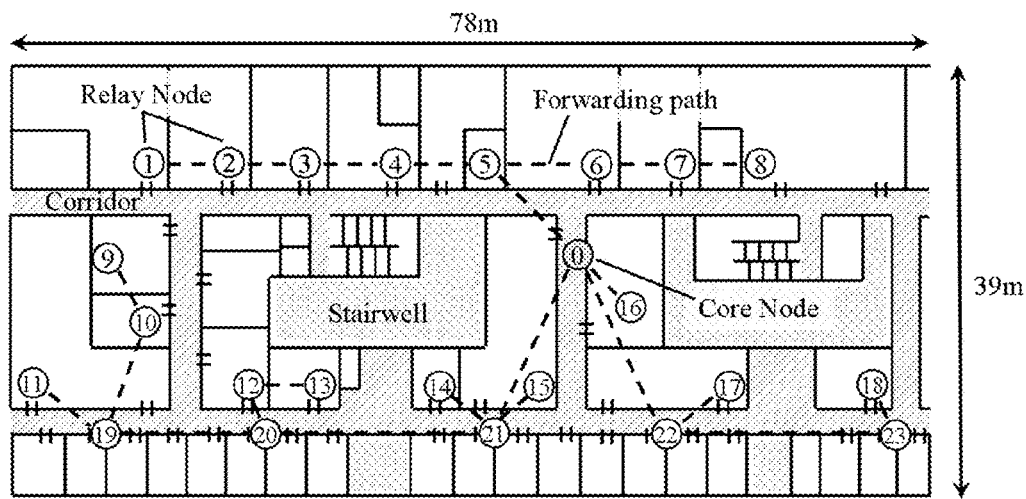
FIG. 5 is a diagram illustrating arrangement of nodes in a simulation of the invention of the present application.

FIG. 5 is a diagram illustrating arrangement of nodes in a simulation of the invention of the present application. Simulation parameters will be described. There is one core node (indicated by reference numeral 0 in FIG. 5). There are 23 slave nodes. In the propagation channel, the path loss coefficient $\alpha$ is 2 up to 5 m. At a place farther than 5 m, the path loss coefficient $\alpha$ is 3.5 (indoor environment model). The routing is performed according to minimum path loss routing. The shadowing is only attenuation (12 dB) caused by a wall. The wireless IF is IEEE802.11a (54 Mbps). The size of data packet is 1500 bytes, and the simulation time is 180 sec. The traffic model is only UDP traffic. The traffic is made based on the Poisson origination in the base node. The number of packets per packet burst is in accordance with the log-normal distribution (Uplink has three packets in average, and Downlink has 20 packets in average. The uplink/downlink total traffic ratio is 1:10.). The IPT is applied to only the downlink traffic from the core node.

Figure 6:
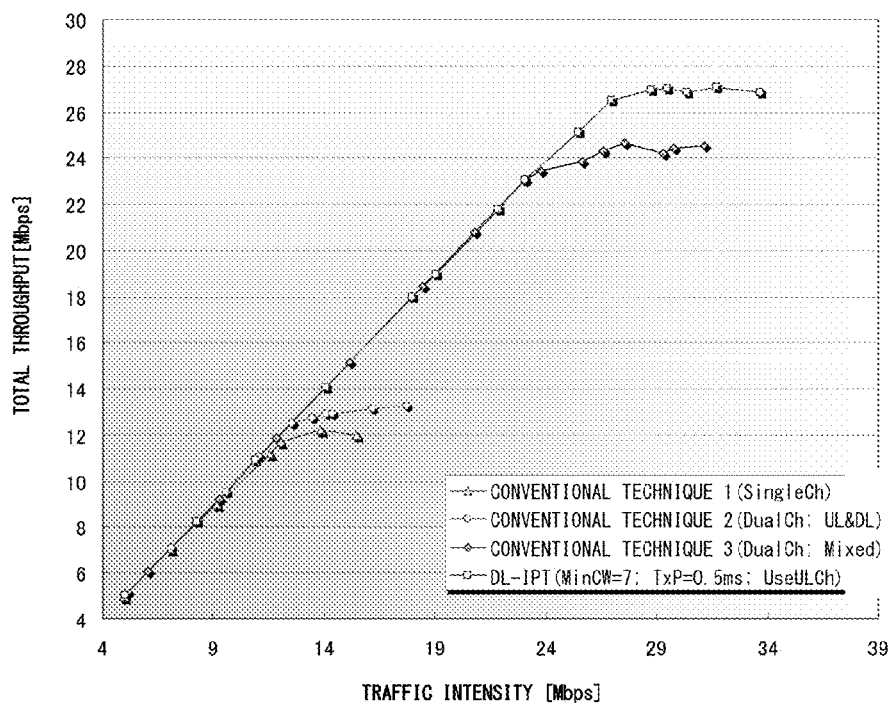
FIG. 6 is a diagram for comparing system throughputs between conventional techniques and an embodiment of the invention of the present application in which IPT is applied to only a downlink channel (DL-IPT).

FIG. 6 is a diagram for comparing system throughputs between conventional techniques and an embodiment of the invention of the present application in which IPT is applied to only a downlink channel (hereinafter referred to as DL-IPT). Three conventional techniques compared here include a technique for allowing one to use only one channel (IF) (SingleCh, hereinafter referred to as "conventional technique 1"), a technique for using two wireless IFs and respectively assigning the channels to uplink and downlink (DualCh; UL&DL, hereinafter referred to as "conventional technique 2"), and a technique for using channels without distinguishing uplink and downlink (DualCh; Mixed, hereinafter referred to as "conventional technique 3"). In the DL-IPT according to the embodiment of the invention of the present application, the IPT is applied to only a downlink channel. The minimum CW is set to 7 [slot time], and the transmission period is set to 0.5 [msec]. However, when a certain amount of downlink packets are accumulated in a queue, uplink channel is also used (link borrowing).

In FIG. 6, the horizontal axis represents the traffic intensity. The vertical axis represents the total throughput. As shown in FIG. 5, the throughput is only about 12 Mbps in the conventional technique 1, and is only about 13 Mbps in the conventional technique 2. In the conventional technique 3, the throughput is only about 24 Mbps, which is about twice as much as those of the conventional technique 1 and the conventional technique 2. In contrast, in the DP-IPT according to the embodiment of the invention of the present application, about 27 Mbps is achieved, which is 12% higher than that of the conventional technique 3.

It should be noted that the traffic in the uplink is less than the traffic in the downlink, and is almost vacant. Therefore, the system throughput is greatly improved by flowing downlink traffic through the uplink.

Figure 7:
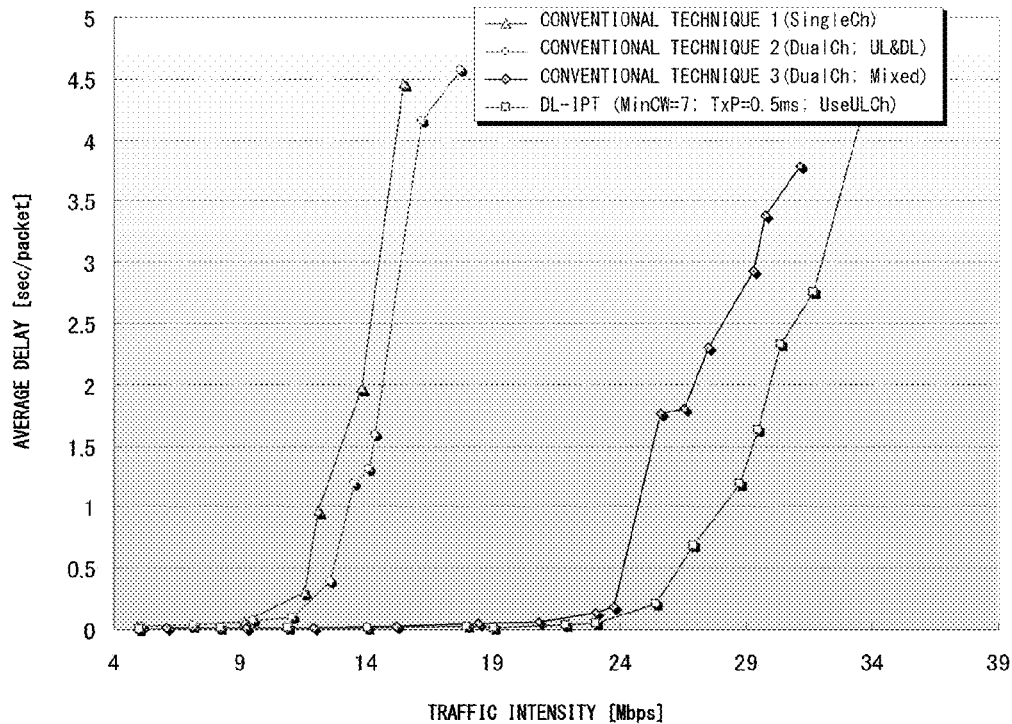
FIG. 7 is a diagram for comparing average delay per packet between the conventional techniques and DL-IPT, i.e., the embodiment of the invention of the present application.

FIG. 7 is a diagram for comparing average delay per packet between the conventional techniques and DL-IPT, i.e., the embodiment of the invention of the present application. The average delay is a time from when a packet is accumulated in a queue and to when the packet is delivered to the final destination node. In FIG. 6, the horizontal axis represents the traffic intensity. The vertical axis represents the average delay. When the average delay exceeds 0.5 [sec/Packet], the value of the traffic intensity is about 12 Mbps in the conventional technique 1, about 13 Mbps in the conventional technique 2, and about 24 Mbps in the conventional technique 3. In contrast, in the DL-IPT according to the embodiment of the invention of the present application, the traffic intensity is about 26 Mbps, which is greatly improved compared with the conventional techniques.

Figure 8:
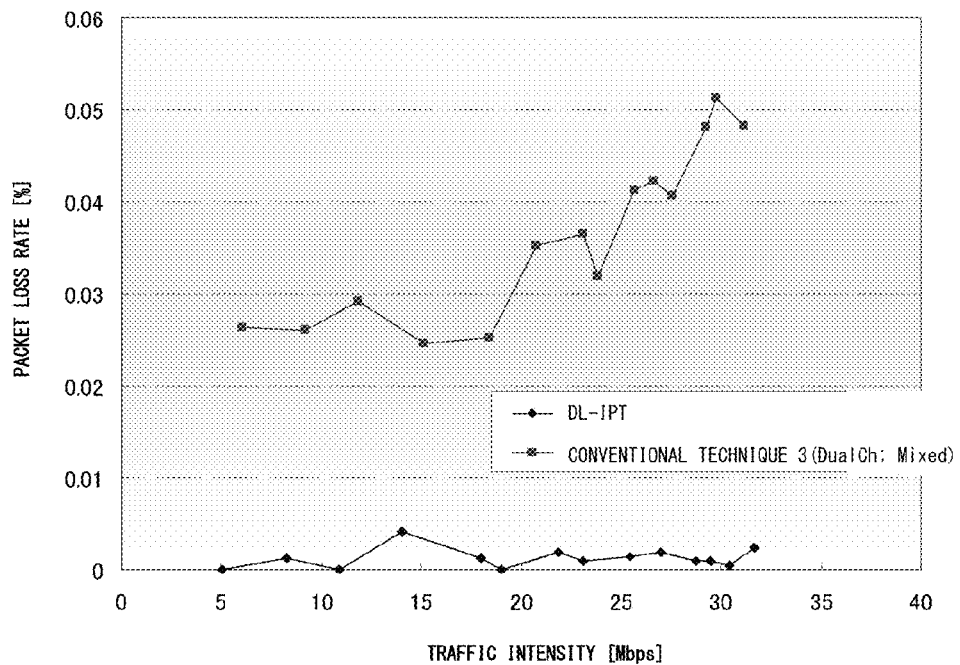
FIG. 8 is a diagram for comparing a packet loss rate in downlink traffic between the conventional technique and DL-IPT, i.e., the embodiment of the invention of the present application.

FIG. 8 is a diagram for comparing a packet loss rate in downlink traffic between the conventional technique and DL-IPT, i.e., the embodiment of the invention of the present application. Herein, the packet loss rate is obtained by dividing the number of discarded packets exceeding the maximum number of retransmission by a summation of the number of successfully-received packets and the number of discarded packets. In FIG. 8, the horizontal axis represents the traffic intensity. The vertical axis represents the packet loss rate. In the conventional technique 3, the packet loss rate is at least 0.02% or more. When the traffic intensity exceeds 20 Mbps, the packet loss rate increases to about 0.05%. In contrast, in the DL-IPT according to the embodiment of the invention of the present application, the packet loss rate is 0.01 or less, or almost equal to 0, which is greatly improved compared with the conventional technique 3.

Figure 9:
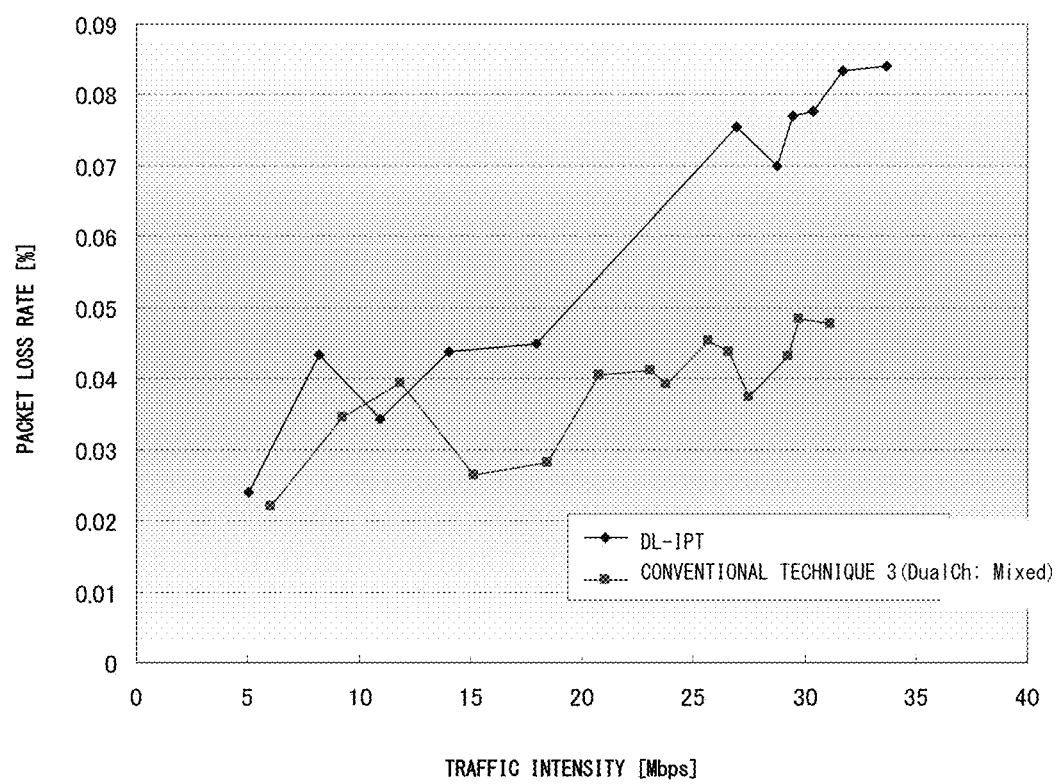
FIG. 9 is a diagram for comparing a packet loss rate in uplink traffic between the conventional technique and DL-IPT, i.e., the embodiment of the invention of the present application.

FIG. 9 is a diagram for comparing a packet loss rate in uplink traffic between the conventional technique and DL- IPT, i.e., the embodiment of the invention of the present application. In FIG. 9, the horizontal axis represents the traffic intensity. The vertical axis represents the packet loss rate. Regarding the uplink traffic, the packet loss rate is at most 0.05% or less in the conventional technique 3. In contrast, in the DL-IPT according to the embodiment of the invention of the present application, the packet loss rate is almost the same value as that of the conventional technique 3 when the traffic intensity is low. However, as the value of the traffic intensity increases, the packet loss rate increases to almost 0.08%.

It should be noted that the improvement by 16 Mbps at maximum speed can be obtained when only the DL-IPT without using the uplink is applied. The improvement by about 20% is obtained over the conventional technique of the same condition.

The invention claimed is:

1. A network system comprising one core node and a plurality of slave nodes, wherein each of the slave nodes includes: a transmission buffer for storing a downlink packet transmitted from the core node to another slave node and an uplink packet transmitted from a slave node to the core node;
    a plurality of communication means for receiving a packet from another node and transmitting a packet stored in the transmission buffer to another node, and the plurality of communication means being set with two kinds of priorities of, a downlink priority and an uplink priority;
    transmission ready packet selection means for selecting a transmission ready packet from among the packets stored in the transmission buffer; and
    communication control means for selecting one communication means according to the downlink priority when the transmission ready packet is the downlink packet or according to the uplink priority when the transmission ready packet is the uplink packet, and causing the selected communication means to transmit the transmission ready packet, and wherein
    the core node includes:
    a transmission buffer for storing a packet;
    a plurality of communication means for receiving a packet from a slave node, transmitting a packet stored in the transmission buffer to a slave node, and the plurality of communication means being set with two kinds of priorities of, a downlink priority and an uplink priority;
    transmission ready packet selection means for selecting a transmission ready packet from among the packets stored in the transmission buffer; and
    communication control means for selecting one communication means according to the downlink priority, and causing the selected communication means to go through a transmission waiting state to transmit the transmission ready packet, thereby defining a predetermined period as a period from when a transmission of a previous packet on the communication means is finished to when the transmission ready packet is transmitted, and
    wherein the communication control means of the core node and/or the slave node selects communication means having the highest priority in a case where not more packets than a predetermined number PNT are stored in the transmission buffer, and
    in a case where more packets than the predetermined number PNT are stored in the transmission buffer, the communication control means of the core node and/or the slave node selects communication means having a subsequently highest priority next to the previously selected communication means when the previously selected communication means is not communication means having the lowest priority, and selects communication means having the highest priority when the previously selected communication means is the communication means having the lowest priority.

2. The network system according to claim 1, wherein each of the slave nodes includes interruption means for generating an interruption when a downlink packet is received, and
    the communication control means of the slave node selects one communication means when the interruption means of the slave node generates an interruption.

3. The network system according to claim 2, wherein the core node periodically transmits a packet to a slave node.

4. The network system according to claim 2, wherein the interruption means generates an interruption when the transmission buffer stores a predetermined number of packets or more.

5. The network system according to claim 1, wherein each of the slave nodes has interruption means for generating an interruption when a new packet is added to the transmission buffer, and
    the communication control means of the slave node selects one communication means when the interruption means of the slave node generates an interruption.

6. The network system according to claim 1, wherein communication means having the highest uplink priority is different from communication means having the highest downlink priority.

7. The network system according to claim 1, wherein the communication control means of the core node employs a period from when a transmission of a previous packet on the communication means is finished to when the transmission ready packet is transmitted, as a transmission period set according to either a slave node to which the transmission ready packet is transmitted, a packet length of the transmission ready packet or both of them.

8. The network system according to claim 1, wherein the transmission ready packet selection means of the core node sets a transmission priority to a packet stored in the transmission buffer and selects a packet having the highest transmission priority as a transmission ready packet, and
    the transmission priority is set so that:
    the longer a packet is stored in the transmission buffer, the higher transmission priority is set thereto,
    two packets next to each other in the transmission priority are transmitted to an identical next hop node, which is a node a packet is subsequently relayed to in a case where a packet is relayed and transmitted, or
    two packets next to each other in the transmission priority are transmitted to different next hop nodes.

9. The network system according to claim 1, wherein the plurality of communication means transmit and receive packets with other nodes by a wireless communication,
    different wireless channels are respectively assigned to the plurality of communication means, and
    the wireless channels assigned to communication means having the same uplink priority or downlink priority on the network are the same.

10. The network system according to claim 1, wherein the plurality of communication means transmit and receive packets with other nodes by a wireless communication, and wherein
    different wireless channels are respectively assigned to the plurality of communication means based on an interference reception level.

11. A node for transmitting a transmission ready packet to another node on a network, wherein
the node includes:
a plurality of communication means being set with two kinds of priorities of, a downlink priority and an uplink priority; and
communication control means for selecting one communication means from among the plurality of communication means according to the downlink priority or the uplink priority, and causing the selected communication means to transmit the transmission ready packet, and
in a case where the node is a slave node, the communication control means selects one communication means according to the downlink priority when a source of the transmission ready packet is a core node, and causes the selected communication means to transmit the transmission ready packet, and
the communication control means selects one communication means according to the uplink priority when a destination of the transmission ready packet is the core node, and causes the selected communication means to transmit the transmission ready packet, and
in a case where the node is a core node, the communication control means selects one communication means from among the plurality of communication means according to the downlink priority, and causes the selected communication means to go through a transmission waiting state to transmit the transmission ready packet, thereby defining a predetermined period as a period from when a transmission of a previous packet on the communication means is finished to when the transmission ready packet is transmitted, and
wherein the communication control means selects communication means having the highest priority in a case where not more packets than a predetermined number PNT are stored in the transmission buffer, and
in a case where more packets than the predetermined number PNT are stored in the transmission buffer, the communication control means selects communication means having a subsequently highest priority next to the previously selected communication means when the previously selected communication means is not communication means having the lowest priority, and selects communication means having the highest priority when the previously selected communication means is the communication means having the lowest priority.

12. A packet forwarding method in a network comprising one core node and a plurality of slave nodes, wherein
the core node and each of the slave nodes include:
a plurality of communication means for communicating with other nodes; and
communication control means for selecting one of the plurality of communication means according to any of an uplink priority and a downlink priority which are, two kinds of priorities set to the plurality of communication means, and causing the selected communication means to transmit a packet,
in a case where a packet is relayed and transferred from the core node to the slave node, the communication control means of the core node selects any of the plurality of communication means according to the downlink priority, and causes the selected communication means to go through a transmission waiting state to transmit the packet to the slave node to which the packet is relayed and transferred,
the communication control means of the slave node having received the packet selects one of the plurality of communication means according to the downlink priority when a destination of the packet is another slave node, and causes the selected communication means to transmit the packet to the slave node to which the packet is relayed and transferred, and
in a case where a packet is relayed and transferred from the slave node to the core node, the communication control means of the slave node selects one of the plurality of communication means according to the uplink priority, and causes the selected communication means to transmit the packet, and
wherein the communication control means selects communication means having the highest priority in a case where not more packets than a predetermined number PNT are stored in the transmission buffer, and
in a case where more packets than the predetermined number PNT are stored in the transmission buffer, the communication control means selects communication means having a subsequently highest priority next to the previously selected communication means when the previously selected communication means is not communication means having the lowest priority, and selects communication means having the highest priority when the previously selected communication means is the communication means having the lowest priority.

13. A network system comprising one core node and a plurality of slave nodes, wherein each of the slave nodes includes:
a transmission buffer for storing a downlink packet transmitted from the core node to another slave node and an uplink packet transmitted from a slave node to the core node;
a plurality of communication means for receiving a packet from another node and transmitting a packet stored in the transmission buffer to another node, and the plurality of communication means being set with two kinds of priorities, of a downlink priority and an uplink priority;
transmission ready packet selection means for selecting a transmission ready packet from among the packets stored in the transmission buffer; and
communication control means for selecting one communication means according to the downlink priority when the transmission ready packet is the downlink packet or according to the uplink priority when the transmission ready packet is the uplink packet, and causing the selected communication means to transmit the transmission ready packet, and
wherein the core node includes:
a transmission buffer for storing a packet;
a plurality of communication means for receiving a packet from a slave node, transmitting a packet stored in the transmission buffer to a slave node, and the plurality of communication means being set with two kinds of priorities of, a downlink priority and an uplink priority;
transmission ready packet selection means for selecting a transmission ready packet from among the packets stored in the transmission buffer; and
communication control means for selecting one communication means according to the downlink priority, and causing the selected communication means to go through a transmission waiting state to transmit the transmission ready packet, thereby defining a predetermined period as a period from when a transmission of a previous packet on the communication means is finished to when the transmission ready packet is transmitted and
wherein the transmission ready packet selection means of the core node sets a transmission priority to a packet stored in the transmission buffer and selects a packet having the highest transmission priority as a transmission ready packet, and the transmission priority is set so that:

the longer a packet is stored in the transmission buffer, the higher transmission priority is set thereto, two packets next to each other in the transmission priority are transmitted to an identical next hop node, which is a node a packet is subsequently relayed to in a case where a packet is relayed and transmitted, or two packets next to each other in the transmission priority are transmitted to different next hop nodes.

\* \* \* \* \*